United States Patent [19]

Proise

[11] Patent Number: 5,274,904
[45] Date of Patent: Jan. 4, 1994

[54] GUIDEWAY COIL OF LAMINATED FOIL CONSTRUCTION FOR MAGNETICALLY LEVITATED TRANSPORTATION SYSTEM

[75] Inventor: Michael Proise, Garden City, N.Y.

[73] Assignee: Grumman Aerospace Corporation, Bethpage, N.Y.

[21] Appl. No.: 741,745

[22] Filed: Aug. 7, 1991

[51] Int. Cl.⁵ .............................................. H01F 7/22
[52] U.S. Cl. ...................................... 29/602.1; 742/1; 156/226; 335/299; 336/223
[58] Field of Search ...................... 29/602.1, 605, 606; 335/299; 336/223; 242/1; 156/226

[56] References Cited

U.S. PATENT DOCUMENTS 3,234,063  2/1966  Masini ................................... 29/606
4,395,693  4/1983  Mazinesco ........................... 336/223

Primary Examiner—Mark Rosenbaum
Assistant Examiner—Kenneth J. Hansen
Attorney, Agent, or Firm—William B. Ritchie

[57] ABSTRACT

Electromagnetic coils of laminated, foil construction are suitable for use in guideways of magnetically-levitated-vehicle systems. The coils are each constructed by applying a double-sided adhesive tape of insulating material to both surfaces of a continuous ribbon of conductive foil to form a tri-layer laminate or matrix. Then, the tri-layer matrix is shaped into a coil of a desired configuration. The coil loops or turns are formed by folding the tri-layer matrix along diagonal fold lines in selected bend regions so as to transpose the top and bottom surfaces of the laminate on either side of the folds, and bring the surface interior of the folds into contact. The insulating material in the laminate is omitted from the interior bend regions, so that, after folds have been made, the interior surfaces in those regions are exposed foil which electrically contact one-another. With this construction, each turn of the coil is separated electrically from adjacent turns by two layers of insulation covering a single layer of foil, except in the bend regions, where two layers of foil are present on the interior of the folds, along with two layers of insulation along the exterior the folds. Alternative constructions in the bend regions avoid unsightly bulging in that area.

3 Claims, 7 Drawing Sheets

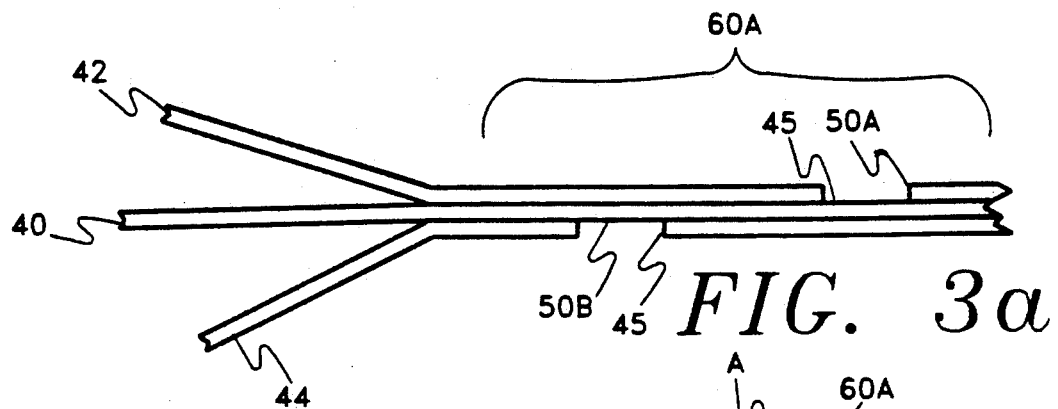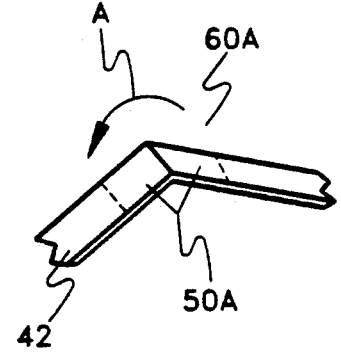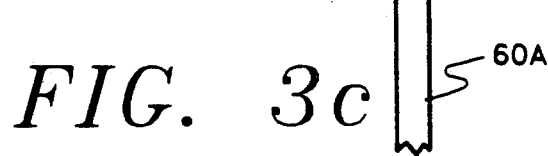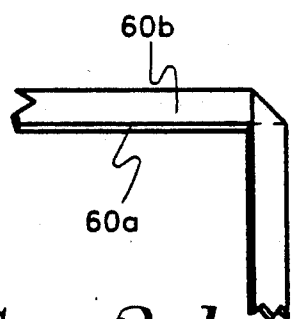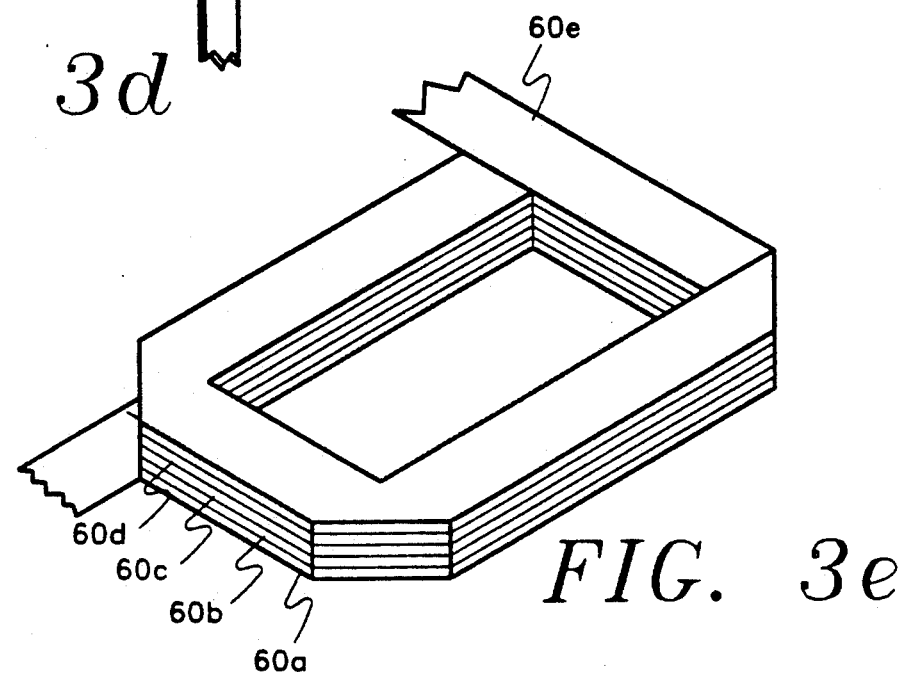

5,274,904

GUIDEWAY COIL OF LAMINATED FOIL CONSTRUCTION FOR MAGNETICALLY LEVITATED TRANSPORTATION SYSTEM

FIELD OF THE INVENTION

The invention relates to magnetically levitated ("maglev") transportation, and more particularly to electrical coils suitable for use in guideways along which maglev vehicles (e.g., trains) are supported and propelled.

BACKGROUND OF THE INVENTION

In known maglev systems, trains run along guideways, which each have thousands of electromagnetic coils per mile. The guideways coils coact with a plurality of electromagnetic and, in some systems, superconducting, coils carried on the undercarriages of the trains. The interaction of the magnetic fields of the two sets of coils provides levitation, propulsion and lateral stability for the maglev trains. The guideway coils in some instances are active (i.e., carrying currents supplied by an external source), and in others are passive (i.e., carrying currents induced by the train coils).

Conventionally, the guideway coils are manufactured by bending electrical wire of, e.g., circular cross-section, (i.e., "round wire") to form stacks of the desired configuration for mounting along the guideway. Typically, the wires are entirely covered with insulation before they are formed into coils.

Often, the coil configurations are complex, with numerous bends and contours conforming to the configuration of the guideway portions on which the coils are mounted. Unfortunately, round wire of sufficient cross-sectional area for carrying the supplied or induced currents can be difficult to shape economically into such configurations.

Another disadvantage of using round wire in the coils pertains to the way stacks of such wire carry mechanical loads. While the maglev trains are levitated, the coils bear a substantial compressive force. Coils made from stacks of round wires carry such loads at points or lines at which the wires within the stacks contact one-another. Under extreme conditions, this arrangement can prove mechanically unstable: Under the load, the wires can and even shift out of position in the stack. Shifting of wires can affect adversely not only the load-carrying ability of the coil, but, if severe, the characteristics of its magnetic field.

It would be desirable to provide guideway coils of improved construction, which overcomes the foregoing drawbacks encountered with the prior art. It would also be desirable for such an improved coil construction to lend itself to automated manufacture. Considering the number of such guideway coils used per guideway mile (e.g., thousands), one can readily appreciate that any expediency that facilitates manufacturing of the guideway coils can significantly reduce the overall costs of maglev systems.

Furthermore, the design of the guideway coils should facilitate their installation in the guideways.

Finally, the design should contribute aesthetically to the sleek, futuristic appearance of proposed maglev systems.

SUMMARY OF THE INVENTION

Briefly, the invention resides in electrical coils of laminated, foil construction, which are suitable for use in maglev guideways. In a first aspect of the invention, the coils are each constructed by applying a double-sided adhesive tape of insulating material to both surfaces of a continuous ribbon or strip of conductive foil to form a tri-layer laminate or matrix. Then, the tri-layer matrix is shaped into a coil of a desired configuration, each turn of the coil being secured adhesively to adjacent turns of the coil. A preferred configuration of the coil has the surfaces of the tri-layer matrix oriented perpendicular to a central core about which the coil is wound. The double-sided insulating tape either is an insulating tape having a suitable adhesive or cement coating on both of its sides, or made of a material which is itself both adhesive and insulating.

In a second aspect of the invention, the coil loops or turns are formed for certain preferred coil configurations by folding the tri-layer matrix along diagonal fold lines in selected bend regions so as to transpose the top and bottom surfaces of the matrix on either side of the folds, and bring the surfaces interior of the folds into contact. Transposition of the surfaces means, for instance, that the top surface on one side of a fold line becomes the bottom surfaces on the other side of the fold line.

In a further aspect of the invention, the insulating material in the tri-layer matrix is omitted from the interior bend regions, so that, after the folds have been made, the interior surfaces are exposed foil which electrically contact one-another in the bend regions. This provides cross-conduction between the contacting surfaces, and, thereby, low resistance paths for current to flow through the folds. The exteriors of the bend regions, however, are fully insulated.

It should be apparent that, even with this latter construction, each turn of the coil is separated electrically from adjacent turns by two layers of insulation covering a single layer of foil, except in the bend regions where, due to the fold, two layers of foil are present in the interior of the fold, between top and bottom layers of insulation on the exterior of the fold.

In coil configurations where, for example, the folds are stacked or nested vertically, one on top of another, the folds can cause the corners to bulge in the thickness direction, i.e., extend in thickness beyond the tri-layer matrix in the balance of the coil turns (i.e., in the coil side elements). While such bulging typically has minimal functional affects on the coil, it is unsightly. In some cases, corning bulging can also complicate installation of the coils in the guideways.

However, corner bulging can be controlled to within acceptable limits for many applications by making the thickness of the foil a fraction, e.g., about 30% to about 50%, of the thickness of the insulating layers.

Alternatively, various measures can be used for substantially eliminating such bulging. For instance, one may omit insulating layers on the exterior of the folds of alternate coil turns in the stack, while using insulating and foil layers that each have about the same thickness. Thus, a corner having no insulation is located vertically between stacked corners having exterior insulation. This substantially eliminates corner bulge, while assuring adequate inter-turn insulation to guard against coil short circuits.

Another practical way of substantially eliminating corner bulge is to form the coil with a tri-layer matrix composed of layers of selected thicknesses which are related to one-another in such a way as to equalize, or nearly equalize, the overall thickness ("T") of the side elements and corners of each turn.

Specifically, I have found that corner bulge is eliminated by constructing the tri-layer matrix from, for instance, a foil layer having a thickness of 30% of T, a first insulating layer (through which windows are formed in the bend regions to expose the foil) having a thickness of 50% of T, and a thinner insulating layer having a thickness of 20% of T. With this arrangement, in each turn, the side elements have a foil layer disposed between the thicker insulating layer and the thinner insulating layer, and the corners have a pair of foil layers disposed between two thinner insulating layers (i.e., one on top and one below the foil layers).

In yet another aspect of the invention, the laminated foil construction is formed and folded into shape in a single, combined procedure that lends itself to an assembly-line type, automated process. For this, a coil-fabrication apparatus is provided with tape dispensing, tape applicator, and coil shaping stations.

At the tape dispensing station, rolls of insulating tapes and foil are mounted preferably on motorized arbors, which rotate at controlled speeds and for controlled durations to unwind and deliver the insulating tapes and foil to the applicator.

In constructing the tri-layer matrix, the applicator applies insulating tape along both surfaces of a segment of the foil, to which the tapes immediately adhere upon contact, and, thereby, forms the tri-layer laminate. In bend regions of the segment, however, the applicator applies the insulation differently, as described above, e.g., only to the side of the foil that will be on the exterior of the fold.

The shaping station winds the coil segment into the shape of a turn of the coil, e.g., by laying the segment directly on the preceding turn, to which it immediately adheres on contact, while folding the segment as necessary in predetermined bend regions.

While that segment is being wound, or immediately thereafter, the insulating tape is applied to the next segment of the foil, and it is used to form the next turn. The process of taping and winding, in alternation, continues until the coil is completed.

Where insulating layers of different thicknesses are used as described above, it is sometimes necessary, due to transposition of the layers of the tri-layer matrix in the bend regions during folding, for the applicator to apply the thinner layer first on one side and then on the other side of the foil to assure that the shaping station will locate the thinner layer on the exterior of the bend regions.

Advantages of this novel construction for guideway coils are many. First, foil provides a relatively large cross-sectional area for high current-carrying capacity, while being more flexible than, e.g., round wire, and thus more readily shaped to conform to any desired guideway contour.

Second, the foregoing method of constructing the coil facilitates its manufacture and is readily automated. Insulating each turn of the coil is achieved by using material in the convenient form of a double-sided adhesive tape. Both the foil and insulating tape can be economically stored and dispensed as rolls.

Third, mechanical loads are distributed across the larger surface areas afforded by the tri-layer foil matrix construction, providing, for example, improved stack stability from turn-to-turn in the coil. Thus, the turns of the coil are less prone to move from their respective positions due to mechanical forces.

Overall, manufacture of coils in this way achieves economy of labor and costs, while providing any of a wide range of guideway coil configurations.

BRIEF DESCRIPTION OF THE DRAWINGS

For a fuller understanding of the features, advantages, and objects of the invention, reference should be made to the following detailed description and the accompanying drawings, in which:

FIGS. 3a through 3e illustrate the steps of a preferred method of fabricating the coil of FIG. 1;

DETAILED DESCRIPTION OF ILLUSTRATIVE EMBODIMENTS

Figure 1:
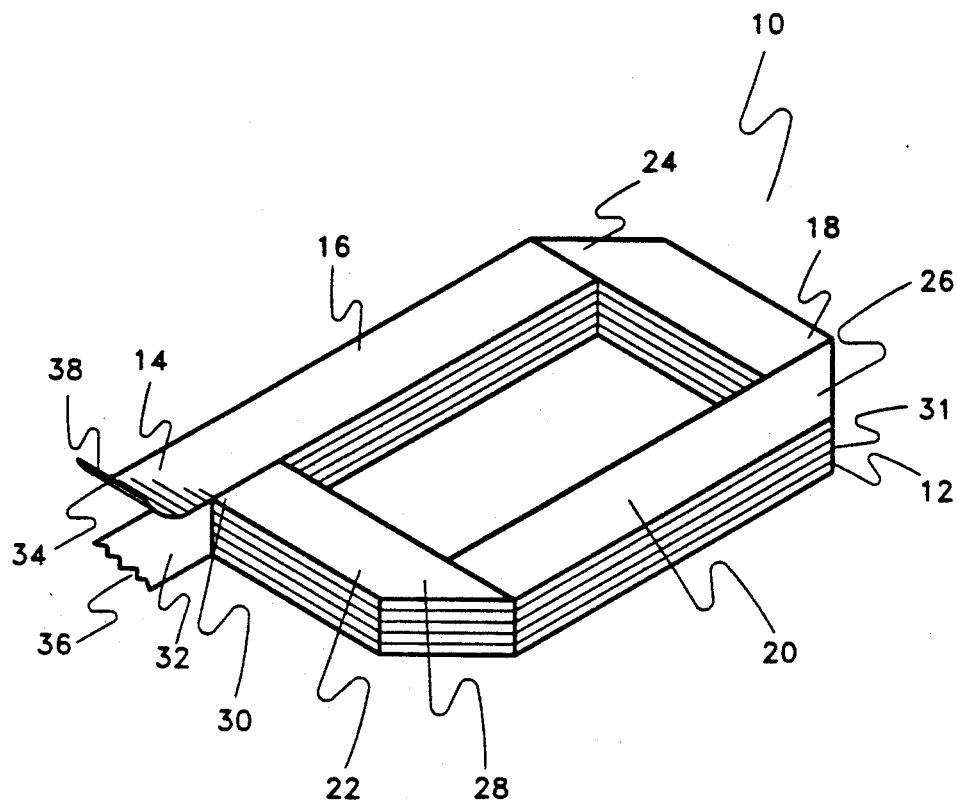
FIG. 1 shows a pictorial view of a guideway coil in accordance with an illustrative embodiment of the invention.

FIG. 1 shows a guideway coil 10 of laminated, foil construction in accordance with the invention. The coil 10 has a plurality of superposed turns or loops 12 of a tri-layer foil matrix 14. As shown, the tri-layer foil matrix 14 of the coil 10 forms a continuous ribbon of material.

Viewed from each end of the coil, the turns 12 appear generally rectangular, each with linear side elements 16–22 connected orthogonally at blunted corners 24–30. The side elements 16–22 and corners 24–30 are formed respectively by straight runs of the tri-layer matrix 14, and by folds of the matrix 14 along diagonal lines 31, so that horizontally adjacent side elements extend at right angles to one-another. The top and bottom surfaces 32, 34 of the tri-layer matrix 14 are generally flat and, in FIG. 1, parallel with the plane defined by the coil turns 12. Leading and trailing ends 36, 38 of the tri-layer matrix 14 are electrically connectable to other circuit elements (not shown), such as other coils of similar configuration to coil 10.

Figure 2:
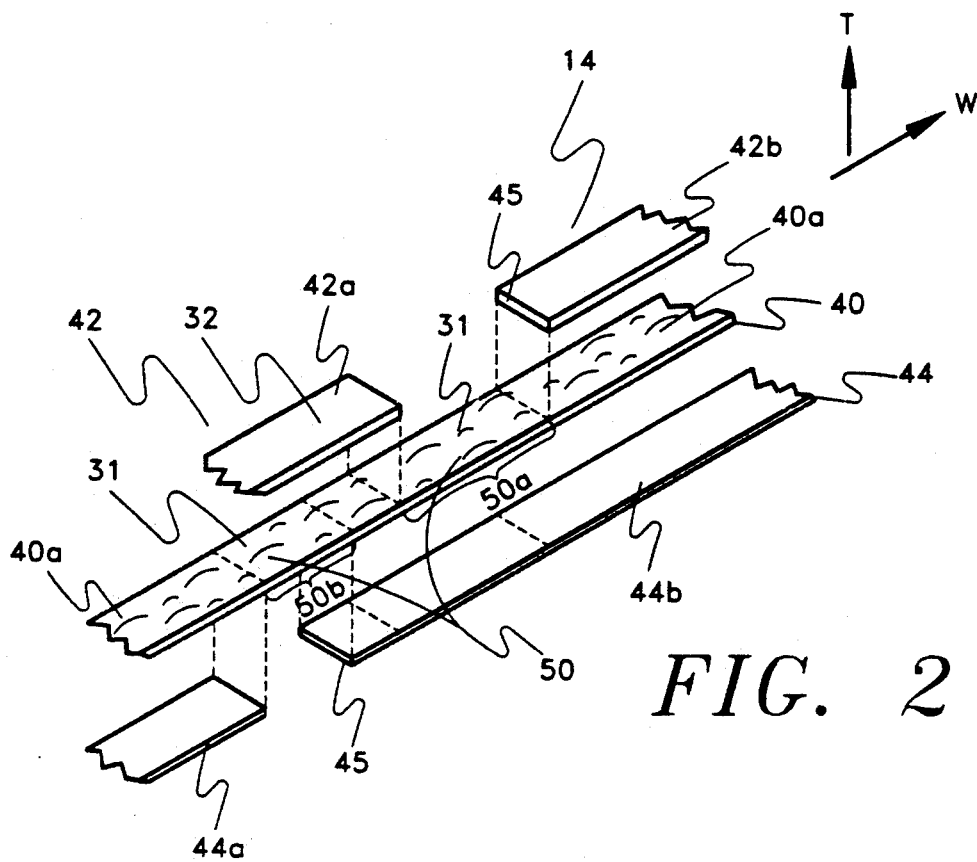
FIG. 2 shows an exploded view depicting the laminated construction of a segment of the guideway coil of FIG. 1.

FIG. 2 shows an exploded view of a length of the tri-layer foil matrix 14, from which its laminated construction is apparent. The dimensions of the tri-layer matrix 14 are, e.g., about three to four inches (7.5 to 10 cm) wide, i.e., in the direction indicated by arrow "W,"

and about 0.05 of an inch (1.25 mm) in thickness, i.e., in the direction indicated by arrow "T."

The matrix 14 has a layer of conductive foil 40, e.g., aluminum or copper alloy, which is interposed between two layers 42, 44 of insulating material, e.g., MYLAR or KAPTON brand material. The insulating layers 42, 44 are secured to the foil 40 with a suitable adhesive or cement 46.

Preferably, insulating layers 42, 44 are each provided in the form of a double-sided adhesive tape, that is, a thin strip of insulating material having a contact-adhesive coating on each side. Alternatively, the insulating tape is made from a material which is both insulating and adhesive. For convenience, the insulating layers 42, 44 will sometimes be referred to simply as the insulating tape.

In a preferred version of the invention, and as illustrated in FIG. 2, the first and second insulating tapes 42, 44 are selectively disposed on areas 40a on both surfaces 32, 34 of the foil 40, that become side elements 16–22, and on only one side of a plurality of bend regions 50, i.e., the side that becomes the exterior of the corners 24–30 after folding the tri-layer matrix into the desired configuration. Thus, windows 45 are formed through the insulation layers 42, 44 on the remaining side of the bend regions 50.

In other words, for constructing coil 10 of FIG. 1, segments 42a, 42b of insulating layer 42 are placed on the foil 40 on both sides of, and without covering, the bend region 50a so as to form windows 45 through the insulation in that region, while segments 44a, 44b of insulating layer 44 are placed on the foil on either side of, and without covering, the bend region 50b, so as also to form a window in that region as well. The need for this pattern of windows 45 formed in adjacent bend regions 50 in alternation on opposite sides of the foil 40 will be appreciated from the following discussion of the actual fabrication of the coil 10.

In forming the coil 10, the tri-layer matrix 14 of FIG. 2 is folded along lines 31, which extend diagonally across the rectangular bend regions 50. Such folding transposes, for instance, the top surface 32 and bottom surface 34 (FIG. 1) of the tri-layer matrix 14 on either side of the fold line 31, and brings the surfaces interior of the fold into contact through the window 45 through the insulation. Transposition of the surfaces means, for instance, that the top surface on a first side of the fold line becomes the bottom surface on a second side of the fold line, and the bottom surface on the first side becomes the top surface on the second.

Accordingly, after a fold has been made, the interior surfaces in the bend region 50 are exposed foil, which electrically contact one-another in that region. This provides cross-conduction between the contacting surfaces, and, thereby, a low-resistance, shortened path for current to flow through the fold, without travelling around the fold.

Since a transposition occurs at every fold, the top and bottom of the tri-layer matrix 14 switch places repeatedly. That is the reason adjacent windows are formed in the bend regions 50 on opposite sides of the tri-layer matrix 14.

FIGS. 3a–3e illustrate the steps of an illustrative version of the method for fabricating the coil 10 (FIG. 1) that has just been described. In FIG. 3a, which is an enlarged view for purposes of clarity, insulating tape 42, 44 is selectively applied on both sides of a first segment 60a of foil 40, leaving windows 45, however, on the top and bottom in the respective bend regions 50a and 50b.

In FIGS. 3b and 3c, the first segment 60a is folded in the direction indicated by arrow A into an "L"-shape, and inverted by 180 degrees along the diagonal lines 31 (FIG. 2) in the bend region 50a, so that the interior surfaces of contact. It will be appreciated without further illustration that this process of folding is continued at various points along first segment 60a until a first turn of the coil 10 is fashioned.

Then, in FIG. 3d, a second segment 60b of the foil 40 that has been taped in the same manner as first segment 60a (see FIG. 3a) is folded and disposed upon the first segment 60a so that a bottom insulating layer 42 of the second segment 60b is disposed on and in contact with, the top insulating layer of the first segment 60a. The steps illustrated in FIGS. 3a–3d are then repeated for successive segments 60c, 60d, etc., of the foil, forming successive coil turns as shown in FIG. 3e.

FIG. 4a–4d show partial, enlarged, side views of a portion of the partially-fabricated coil 10 formed by segments 60a and 60b, which illustrate its sandwich-like construction in accordance with various embodiments of the invention.

Figure 4A:
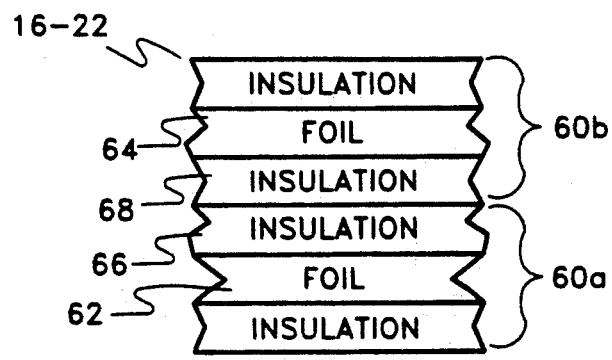
FIG. 4a is enlarged side view of a portion of the side elements of the coil of FIG. 1.

FIG. 4a shows that the side elements 16–22 of the turn formed by segment 60a of the coil 10 each have a foil layer 62 separated electrically from the foil layer 64 of the adjacent turn formed by segment 60b by two layers of insulation 66, 68. Insulating layer 66 is provided by segment 60a, while insulating layer 68 is contributed by segment 60b.

Figure 4B:
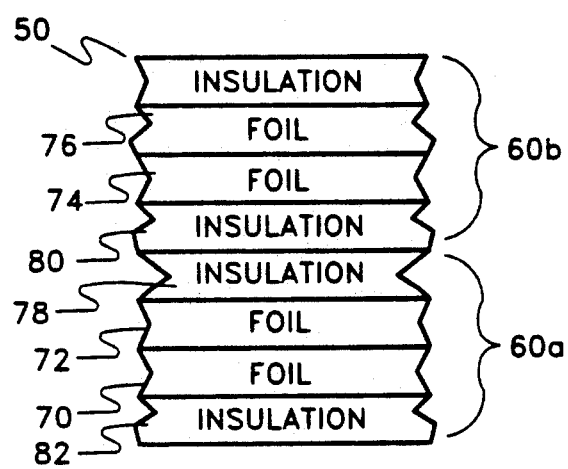
FIG. 4b is an enlarged side view of a portion of one of the corners of the coil of FIG. 1.

FIG. 4b shows that the bend regions 50 of the turn formed by segment 60a each have, due to the fold, two contacting layers of foil 70, 72 on the interior of the fold, that are separated from the foil layers 74, 76 of the turn formed by segment 60b by two layers of insulation 78, 80 extending along the exterior the fold. As before, insulating layer 78 is provided by segment 60a, while insulating layer 80 is contributed by segment 60b.

In coil configurations like coil 10, in which the folds are stacked or nested vertically one on top of another, as illustrated in FIG. 4b, it is undesirable for the folds to cause the corners of a turn to bulge in the thickness direction, that is, extend in thickness beyond the coil side elements 16–22 of the same turn. Such bulging can be controlled to within acceptable limits for many applications by making the thickness of the foil layer a fraction, e.g., about 30% to about 50%, of the thickness of the insulating layers.

Figure 8:
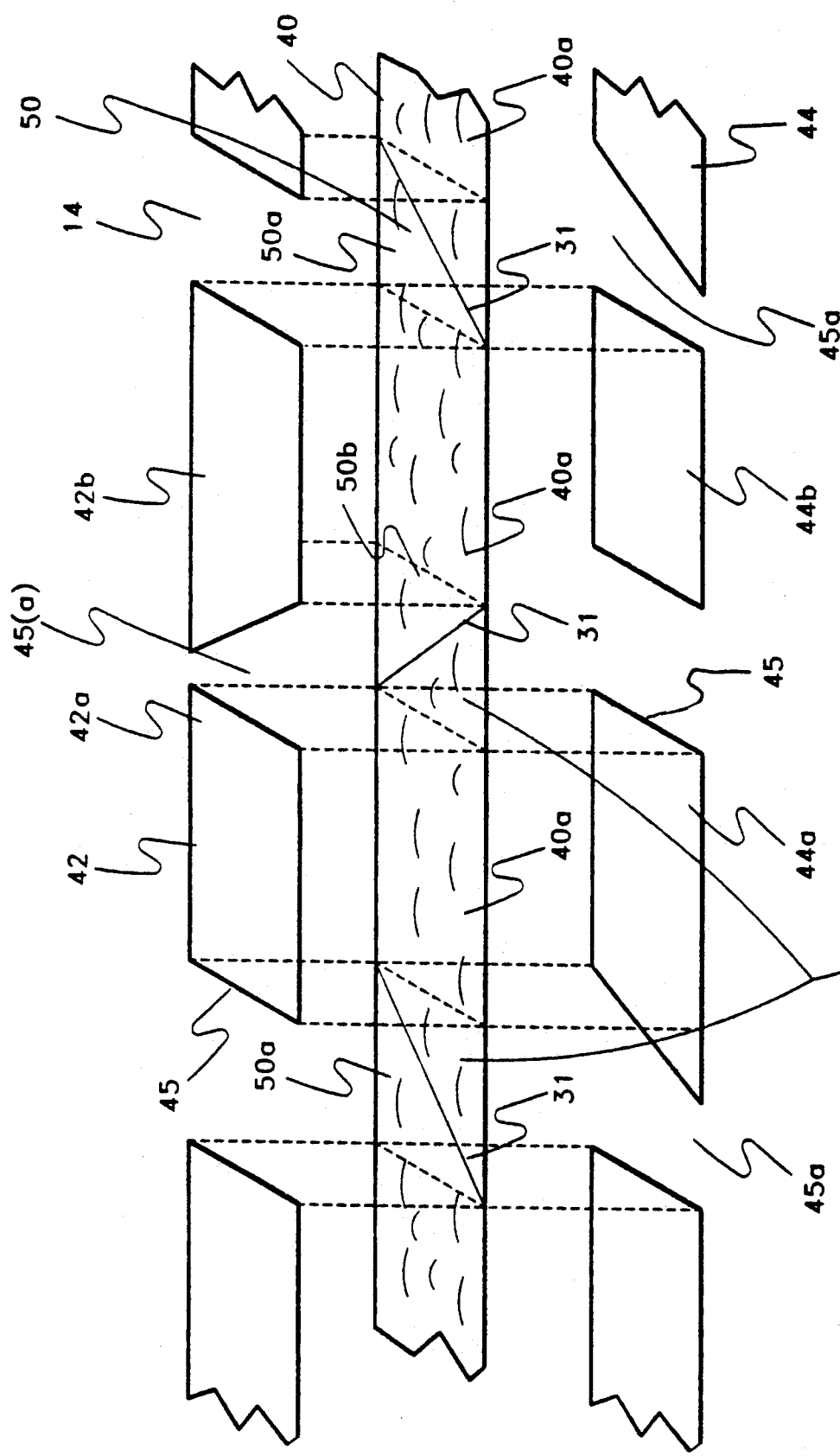
FIG. 8 shows an exploded view depicting the laminated construction of the preferred embodiment of the guideway coil according to the invention.

In the preferred embodiment of the invention, and as illustrated in FIG. 8, the first and second insulating tapes 42, 44 are selectively disposed on areas 40a on both surfaces 32, 34 of the foil 40, that become side elements 16–22, and on only partially on one side of a plurality of bend regions 50, i.e., the side that becomes the exterior of the corners 24–30 after folding the tri-layer matrix into the desired configuration. Thus, windows 45 are formed through the insulation layers 42, 44, and partial windows 45a on the remaining side of the bend regions 50. This permits equal thicknesses of foil and insulation yet elimination of corner bulges.

In other words, for constructing the coil of FIG. 8, segments 42a, 42b of insulating layer 42 are placed on the foil 40 on both sides of, and without covering, the bend region 50a so as to form windows 45 through the insulation in that region and partially covering the bend region 50b; while segments 44a, 44b of insulating layer 44 are placed on the foil on either side of, and without covering, the bend region 50b, so as also to form a window in that region as well and are placed on the foil on either side of, and partial covering, the bend region 50a.

In forming the coil 10, the tri-layer matrix 14 of FIG. 8 is folded along lines 31, which extend diagonally across the rectangular bend regions 50. Such folding transposes, for instance, the top surface 32 and bottom surface 34 (FIG. 1) of the tri-layer matrix 14 on either side of the fold line 31, and brings the surfaces interior of the fold into contact through the window 45 through the insulation. Transposition of the surfaces means, for instance, that the top surface on a first side of the fold line becomes the bottom surface on a second side of the fold line, and the bottom surface on the first side becomes the top surface on the second.

Accordingly, after a fold has been made, the interior surfaces in the bend region 50 are exposed foil, which electrically contact one-another in that region. This provides cross-conduction between the contacting surfaces, and, thereby, a low-resistance, shortened path for current to flow through the fold, without travelling around the fold. Also, the exterior surfaces in the bend region 50 have exposed foil on side, and insulation on the other, in an alternating manner. Since a transposition occurs at every fold, the top and bottom of the tri-layer matrix 14 switch places repeatedly. That is the reason adjacent windows and partial windows are formed in the bend regions 50 on opposite sides of the tri-layer matrix 14. Thus, the completed coil will achieve the corner construction shown in FIG. 4c which eliminates corner bulging. One insulating layer (for example, layer 78 (FIG. 4b) is eliminated on each exterior corner fold.

Thus, the foil layers 84, 86 of segment 60a are separated from the foil layers 88, 90 of segment 60b only by the insulating layer 92 of segment 60b.

Generalizing, using this approach, the insulating layers are omitted on the exterior of the folds of alternate turns in the coil 10. Thus, there is a corner having no insulation located vertically between stacked corners having exterior insulation.

Figure 4C:
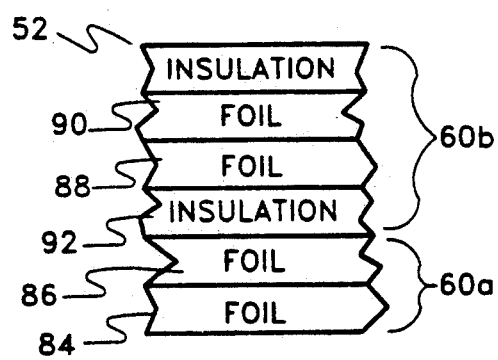
FIGS. 4c and 4d are enlarged side views of alternative constructions for the corner portion of FIG. 4b, which avoid corner bulging due to the folding of the tri-layer matrix.

With the arrangement of FIG. 4c, every pair of adjacent corners in the stack contains a total of six layers, the same number as in the coil side elements, and of substantially the same overall thickness as the side elements. Thus, corner bulge is substantially eliminated, while assuring adequate inter-turn insulation to guard against coil short circuits.

Corner bulge can also be eliminated by constructing a tri-layer matrix of total thickness "T" from a foil layer having a thickness of 30% of T, a first, thicker insulating layer (through which windows are formed in the bend regions) having a thickness of 50% of T, and a second, thinner insulating layer having a thickness of 20% of T.

Figure 4D:
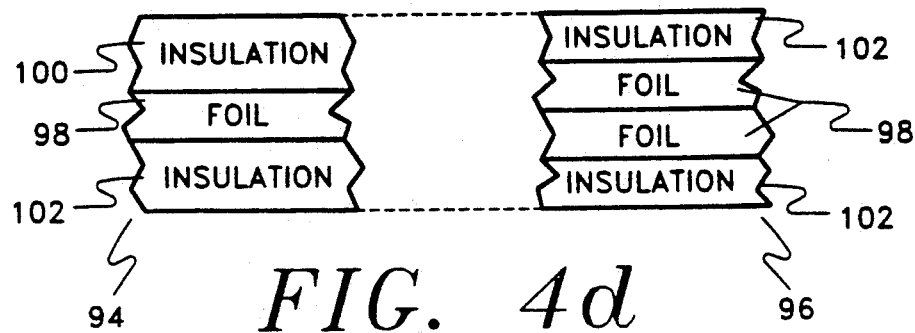

FIG. 4d shows a portion of a side element 94 on the left side of the drawing, and a portion of a corner 96 on the right side of the drawing, both made from the just-described tri-layer matrix. With the illustrated construction, both side element 94 and corner 96 have thickness T, though they have different numbers of constituent layers.

The side element 94 has one foil layer 98 disposed between a thicker insulating layer 100 and a thinner insulating layer 102. On the other hand, the corner 96 (at which, it will be remembered, the tri-layer matrix is folded and a window through the thicker layer 100 is located) has a pair of foil layers 98 disposed between two thinner insulating layers 102 (i.e., one on top and one below the foil layers).

Figure 5A:
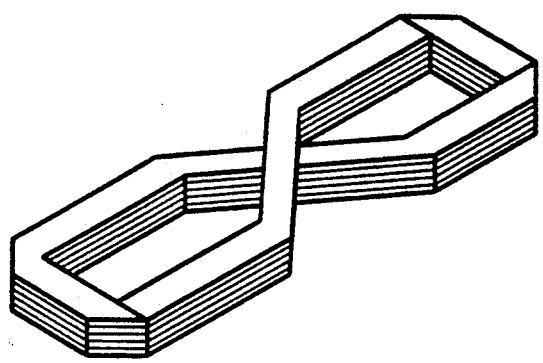
FIGS. 5a through 5e are pictorial views of guideway coils of alternative configurations to that shown in FIG. 1.
Figure 5B:
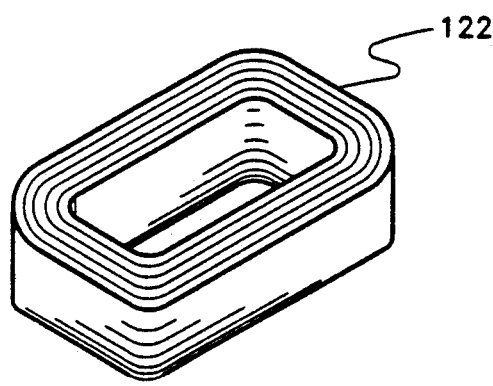
Figure 5C:
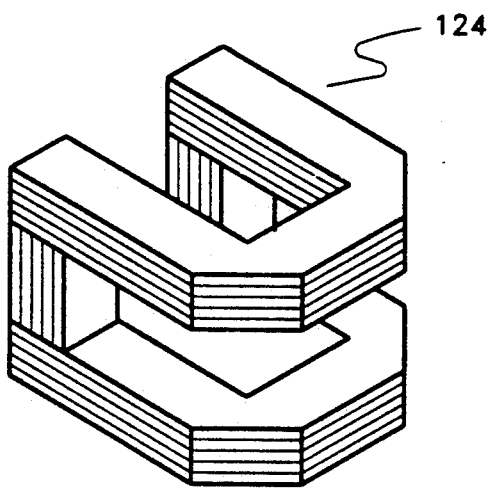
Figure 5D:
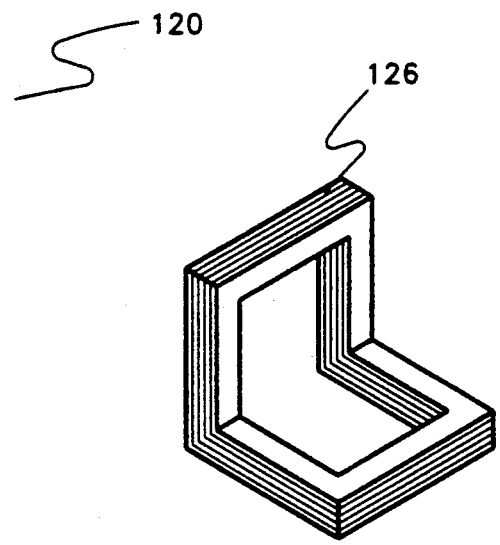
Figure 5E:
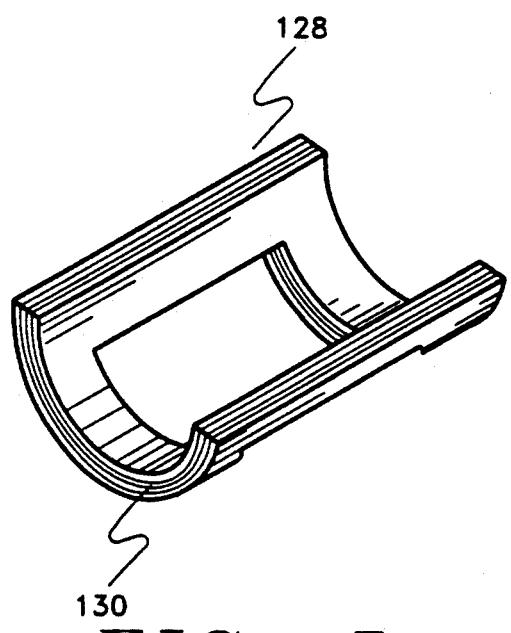

FIGS. 5a–5e show examples of other configurations of coils made of the tri-layer matrix in accordance with the invention. FIG. 5a depicts a coil 120 having a "figure-8" geometry. FIG. 5b shows a coil 122 in which the coil turns are radially nested and the thickness dimension of the tri-layer matrix is perpendicular to the central axis of the coil. Note that this design does not employ corners, as described above. FIG. 5c shows a coil 124 having a "c"-shaped profile. FIG. 5d shows a coil 126 having an "L"-shaped profile. Finally, FIG. 5e shows a coil 128 having arcuate side elements 130.

Figure 6:
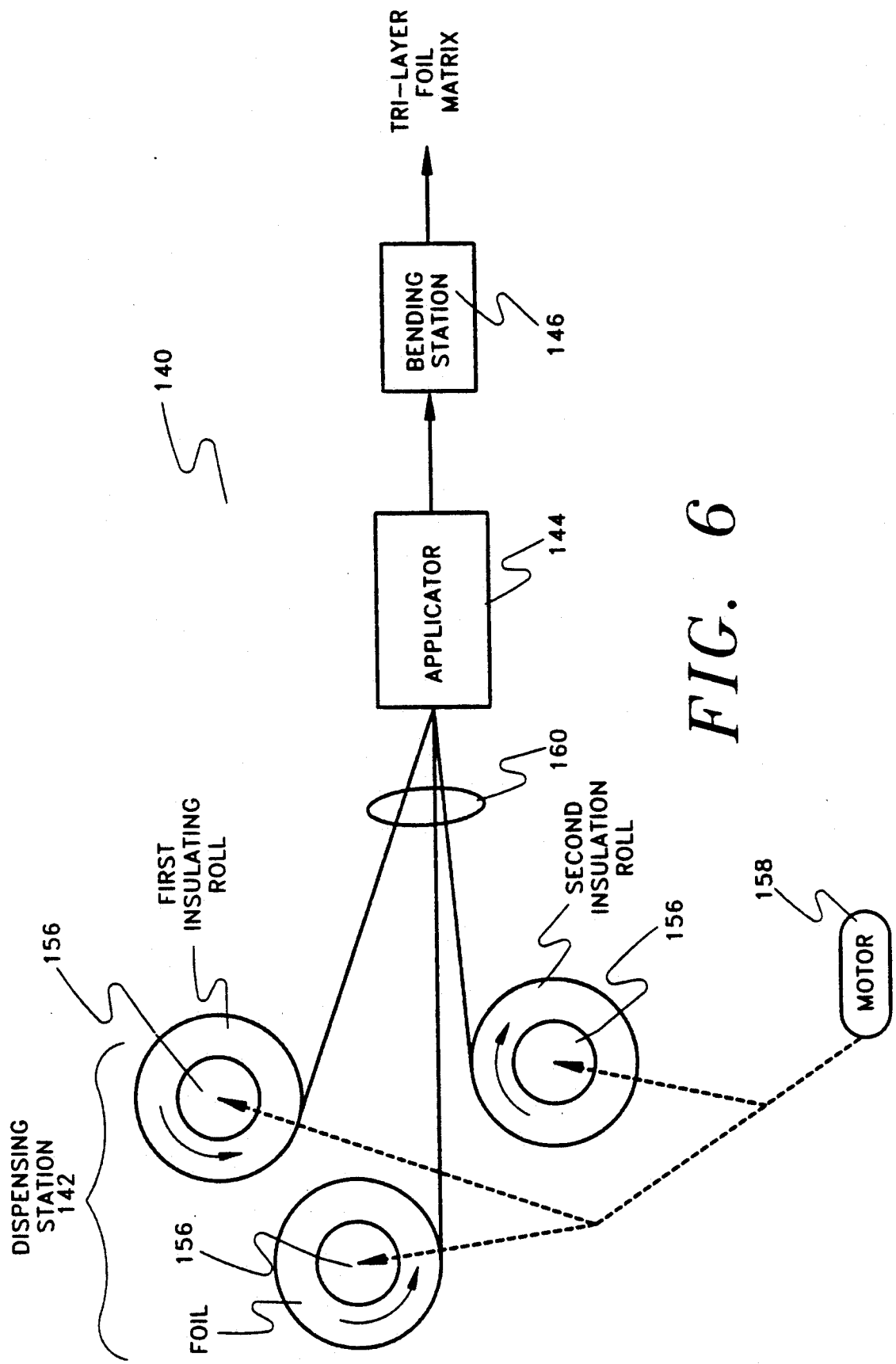
FIG. 6 is a representation, partially in block diagram form, of a coil fabricating apparatus in accordance with the invention.

FIG. 6 depicts a coil fabrication apparatus 140 in accordance with the invention, in which coils of laminated foil construction, such as those shown in FIGS. 1 and 5a–5d, are formed and folded into shape in a single, combined procedure that lends itself to an assembly-line type, automated process. For this, the coil-fabrication apparatus 140 is provided with tape dispensing, tape applicator, and coil shaping stations 142, 144, 146.

At the tape dispensing station 142, rolls of insulating tapes 150, 152 and a roll of foil 154 are mounted preferably on arbors 156, which are rotated by a motor or other prime mover 158 at controlled speeds and for controlled durations to unwind and deliver ribbons 160 of the insulating tapes and foil to the applicator 144.

In constructing the tri-layer matrix, the applicator 144 applies insulating tape along both surfaces of a segment of the foil, to which the tapes immediately adhere upon contact, cuts the insulating tapes 150, 152 where necessary, and, thereby, forms the tri-layer laminate. In bend regions of the segment, however, the applicator 144 applies the insulation differently, as described above, e.g., only to the side of the foil that will be on the exterior of the fold.

After application of the tape to the foil segment, the shaping station 146 winds the segment into the shape of a turn of the coil, e.g., by laying the segment directly on the previously shaped, preceding turn, to which it immediately adheres on contact, while folding the segment as necessary in pre-determined bend regions.

While that segment is being wound, or immediately thereafter, the insulating tape is applied to the next segment of the foil, and it is used to form the next turn. The process of taping and winding, in alternation, continues until the coil is completed.

Where insulating layers of different thicknesses are used as described above, it is sometimes necessary, due to transposition of the layers of the tri-layer matrix in the bend regions during folding, and depending on the direction of bending if the tri-layer matrix, for the applicator to apply the thinner layer first on one side and then on the other side of the foil to ensure that the shaping station will locate the thinner layer on the exterior of the bend regions.

Figure 7A:
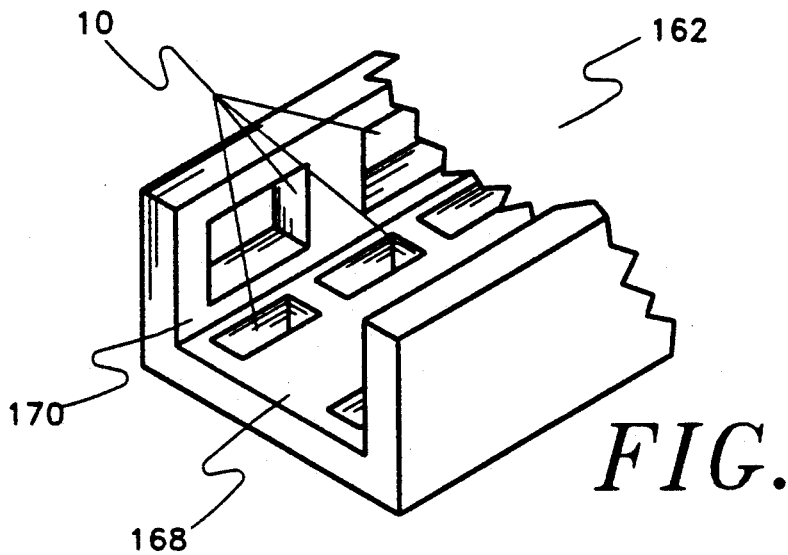
FIG. 7a through 7c are pictorial views of illustrative, alternative constructions of guideways utilizing coils of various configurations in accordance with the invention.
Figure 7B:
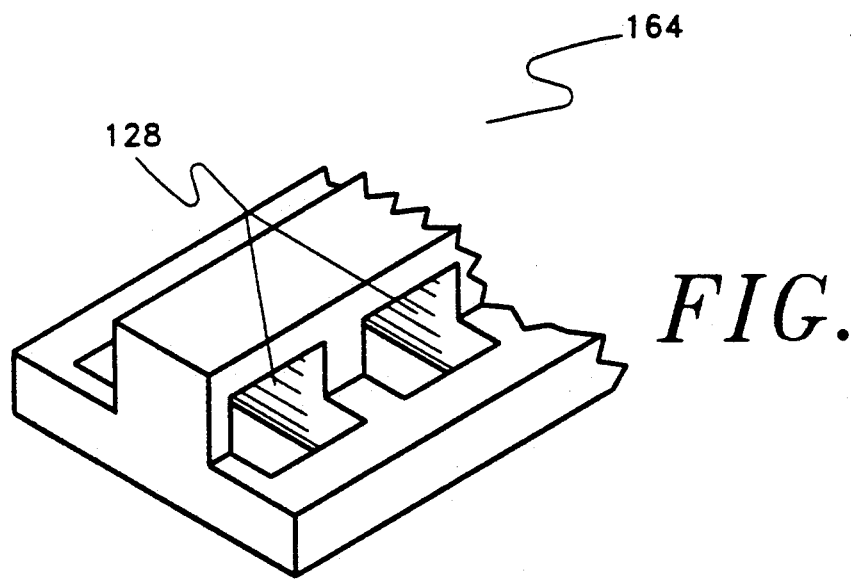
Figure 7C:
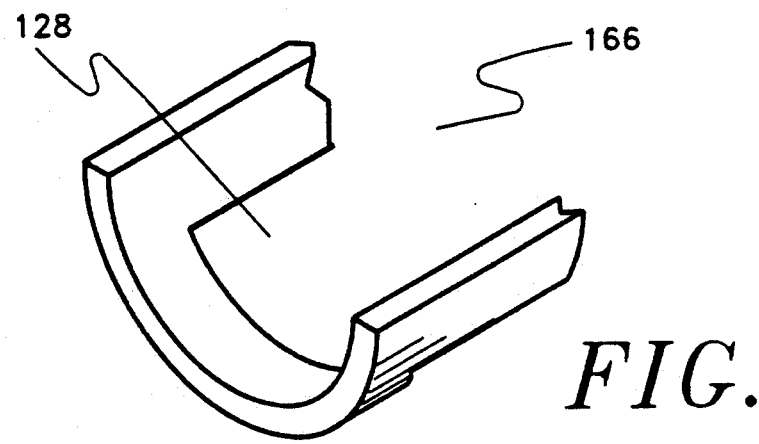

FIGS. 7a–7c show alternative examples of MAGLEV guideways 162–166 using coils 10 in accordance with the invention. In FIG. 7a, the guideway 162 is in the form of a "U"-shaped trough having guideway coils 10 at intervals along its floor 168 and side walls 170. In FIG. 7b, the guideway 164 has an inverted "T"-shaped rail, which is fitted with "L"-shaped coils 126, whose shape is shown more clearly in FIG. 5d. Finally, in FIG. 7c, the guideway 166 is "U"-shaped, and is provided with coils 128 of FIG. 5e.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A method of fabricating an electrical coil of laminated, foil construction, which is suitable for use in a maglev guideway, comprising the steps of: applying a double-sided adhesive tape of insulating material to first and second surfaces of a continuous ribbon of conductive foil to form a tri-layer matrix; shaping the tri-layer matrix into a coil of a desired configuration and having a plurality of turns adhesively secured to one-another by said insulating tape; wherein the shaping step includes the steps of forming a plurality of corners in each of a plurality of coil turns by folding the tri-layer matrix along diagonal fold lines in selected bend regions so as to transpose top and bottom surfaces of the tri-layer matrix on either side of the fold lines, and after said bend region has been transposed, said top surface facing said bottom surface on either side of the fold lines are brought into contact forming an interior of the corners.

2. The method of claim 1, wherein the applying step includes applying the insulating tape to said first and second sides except in those regions thereof which are disposed in the interior of the corners, so that, after the folding step, the interior surfaces are exposed foil which electrically contact one-another in the bend regions for providing cross-conduction between the contacting surfaces, and, thereby, low resistance paths for current to flow through the fold, while insulating between coil turns.

3. The method of claim 1, wherein the applying step includes applying the insulating tape to said first and second sides except in those regions thereof which are disposed in the interior of the corners, and partially applying the insulting tape in those regions which are opposite thereof to those regions which are disposed in the interior of the corners, so that, after the folding step, the interior surfaces are exposed foil which electrically contact one-another in the bend regions for providing cross-conduction between the contacting surfaces, and, thereby, low resistance paths for current to flow through the fold, while insulating between coil turns and the exterior corners are separate by a single layer of insulating tape.

* * * * *